United States Patent
He et al.

(10) Patent No.: US 11,596,991 B2
(45) Date of Patent: Mar. 7, 2023

(54) PROCESSING METHOD OF NPR STEEL REBAR ROD

(71) Applicants: Manchao He, Beijing (CN); Min Xia, Beijing (CN)

(72) Inventors: Manchao He, Beijing (CN); Min Xia, Beijing (CN); Hongyan Guo, Beijing (CN); Hongchao Li, Hebei Province (CN)

(73) Assignee: Min Xia, Beijing (CN)

( * ) Notice: Subject to any disclaimer, the term of this patent is extended or adjusted under 35 U.S.C. 154(b) by 0 days.

(21) Appl. No.: 17/634,181

(22) PCT Filed: Sep. 28, 2020

(86) PCT No.: PCT/CN2020/118267
§ 371 (c)(1),
(2) Date: Feb. 9, 2022

(87) PCT Pub. No.: WO2021/032215
PCT Pub. Date: Feb. 25, 2021

(65) Prior Publication Data
US 2022/0266394 A1  Aug. 25, 2022

(30) Foreign Application Priority Data
Aug. 21, 2019 (CN) .......................... 201910775081.5

(51) Int. Cl.
*B21C 1/00* (2006.01)
*B23K 31/02* (2006.01)

(52) U.S. Cl.
CPC ................ *B21C 1/00* (2013.01); *B23K 31/02* (2013.01)

(58) Field of Classification Search
CPC .. B21F 45/006; B21F 1/02; B21F 3/02; B21F 1/023; B23K 31/02; B21C 1/02;
(Continued)

(56) References Cited

U.S. PATENT DOCUMENTS 3,326,025 A * 6/1967 Nishioka ................. B21F 9/007
72/166
3,343,395 A * 9/1967 Lagermasini ............. B21C 1/02
72/274

FOREIGN PATENT DOCUMENTS

CN 1067835 A 1/1993
CN 1398683 A 2/2003
(Continued)

OTHER PUBLICATIONS

Translation, JP 2001-079603A, Kimura Mar. 2001.*
(Continued)

*Primary Examiner* — Edward T Tolan
(74) *Attorney, Agent, or Firm* — Fox Rothschild LLP; Carol E. Thorstad-Forsyth

(57) ABSTRACT

A processing method of NPR steel rebar rod is disclosed. The NPR steel rebar is cold processed and has a yield strength of 800~950 MPa, a tensile strength of 900~1100 MPa, and a percentage elongation at maximum force of not less than 10~40%. The processing method comprises the following steps: a I-shaped placing step L20, an uncoiling step L30, a flattening step L40, a butt welding step L50, a sandblasting step L60, a straightening step L70, a pointing step L80, a hydraulic head-pushing step L90, a cold drawn spiral ribbing step L10, a straight forward continuous wire drawing and traction step L11, a pre-straightening step L12, a fine straightening step L13, and a cutting-off step L14. The processing method can meet the automatic intelligent production requirements of NPR steel rebar, cold rolled spiral NPR steel rebar, and pre-stressed NPR steel rebar.

3 Claims, 3 Drawing Sheets

(58) Field of Classification Search
CPC ......... B21C 1/163; B21C 5/006; B21C 19/00; B21C 1/00; B21B 1/163
See application file for complete search history.

(56) References Cited

FOREIGN PATENT DOCUMENTS

| CN | 1686664 | A |   | 10/2005 |   |          |
|----|---------|---|---|---------|---|----------|
| CN | 201012451 | Y | | 1/2008 | | |
| CN | 101269397 | A | | 9/2008 | | |
| CN | 101823086 | A | | 9/2010 | | |
| CN | 102061370 | A | | 5/2011 | | |
| CN | 202667241 | U | | 1/2013 | | |
| CN | 103128128 | A | | 6/2013 | | |
| CN | 203141037 | U | | 8/2013 | | |
| CN | 103498036 | A | | 1/2014 | | |
| CN | 104353697 | A | | 2/2015 | | |
| CN | 205519052 | U | | 8/2016 | | |
| CN | 106311795 | A | | 1/2017 | | |
| CN | 207272039 | U | | 4/2018 | | |
| CN | 108754305 | A | | 11/2018 | | |
| CN | 108754339 | A | | 11/2018 | | |
| CN | 109013741 | A | | 12/2018 | | |
| CN | 109702032 | A | | 5/2019 | | |
| CN | 110524192 | A | | 12/2019 | | |
| JP | 2000076942 | A | | 3/2000 | | |
| JP | 2000197939 | A | | 7/2000 | | |
| JP | 2001-079603 | A | * | 3/2001 | ................ | B21F 1/02 |

OTHER PUBLICATIONS

Translation, CN 103128128A, Wu Jun. 2013.*
Translation, CN 108754305A, He et al. Nov. 2018.*
Translation, CN 1398683A, Wu Feb. 2003.*
https://epaper.qingdaonews.com/html/qdrb/20191115/qdrb1308417.html Nov. 2019.
Bang-Sheng et al.: "Thirty Thousand Tons Annual Output of Small-diameter Cold-rolled Thread Steel Production Line and Technical and Economic Analysis", Coal Mine Machinery, vol. 31 No. 02, Feb. 2010.
International Search Report in PCT/CN2020/118267 dated Dec. 30, 2020.

* cited by examiner

PROCESSING METHOD OF NPR STEEL REBAR ROD

CROSS-REFERENCE TO RELATED APPLICATIONS

This application is a § 371 national phase entry of International Patent Application No. PCT/CN2020/118267, filed on Sep. 28, 2020, which claims priority to and the benefit of Chinese Patent Application No. 201910775081.5, filed on Aug. 21, 2019, both of which are hereby incorporated herein by reference in their entireties.

TECHNICAL FIELD

The present disclosure relates to the technical field of steel production, in particular to a processing method of NPR steel rebar rod.

BACKGROUND

As the prior art, the new NPR materials overcome the local deformation and fracture of ordinary rebars and pre-stressed steel rebars, and achieve high strength and high toughness, with a yield strength of up to 900 MPa and a percentage elongation at maximum force of not less than 20%. The automatic intelligent cold rolled (cold drawn) NPR steel rebar rod production line is mainly for cold processing of the new NPR materials, and the products mainly include NPR steel rebars with a diameter of less than 14 mm, cold rolled spiral NPR steel rebars, and pre-stressed NPR steel rebars.

The automatic intelligent production of cold rolled (cold drawn) NPR steel rebar includes the following steps: head-to-tail welding, rust removal by steel wire wheel or shot blasting and grit blasting, uncoiling, flattening, pointing or hydraulic pushing head, cold rolled spiral ribbing or cold rolled ribbing, diameter reducing by a wire drawing die or a straight forward continuous wire drawing machine, pre-straightening, fine straightening, sizing, cutting off, unloading from the rack, placing on a conveying mechanism, bundling, conveying, placing on a material turnover rack, and turning-over materials.

For the conventional ordinary steel rebar cold processing production line, after pickling and phosphating, a cannon de-coiler rack or a rotating uncoiling reel is used to uncoil, a disc-type wire drawing machine is used for traction and wire drawing, pointing, and cold drawing by a wire drawing die is performed, then straightening and cutting off are performed. But it cannot be directly applied to the processing of NPR steel rebar.

The conventional ordinary steel rebar cold processing production line has the following technical drawbacks.

First, the conventional oxide scale removing process using pickling and phosphating cannot meet the national green environmental protection requirements, and cannot achieve inline digital production.

Second, the conventional canon de-coiler rack for coiling and uncoiling can be used for low-carbon, small-diameter steel rebars only, and cannot be used for high-carbon steel rebars or large-diameter high-carbon steel rebars, especially NPR steel rebars that produce resistance due to external forces. The disc-type coil rack cannot be used for the uncoiling of high-strength steel rebars or large-diameter rebars. The above two uncoiling methods cannot achieve continuous production without stopping, and cannot meet the uncoiling requirements of high-strength steel rebars, either.

Third, the conventional steel rebar welding machine can only meet the welding requirements of low-carbon or ordinary high-carbon steel wire; it cannot meet the welding requirements of large diameter, high strength, austenitic steel rebars, cannot realize the automatic burr removal function, and cannot complete the digital operation.

Fourth, the conventional steel rebars are head threaded by pointing or sharpening, resulting in high labor intensity for workers and safety hazards during the operation. The length of rolled head part of steel rebar is too long, and the pointed tip part cannot be used in practical applications and treated as waste, resulting in a great waste of raw materials.

Fifth, in the conventional process, wire drawing dies are used for reducing the diameter and forming. During the processing of high-strength steel wires or austenitic steel rebars, the service life of the wire drawing dies is as short as only 2~3 tons. The cost of the die is extremely high, which accounts for about 60% of its processing costs. The mold needs to be replaced frequently, and the replacement of mold is time-consuming and labor-intensive. Repeated head threading causes a great waste of steel rebar raw materials. Grease lubrication is required, which increases the processing cost of steel rebars.

Lastly, the conventional ordinary steel rebar cold processing production line cannot achieve automated production, remote monitoring, product source tracking of produced rebars, or intelligent storage from raw materials to processing, and cannot achieve intelligent monitoring throughout the entire processing.

In sum, the conventional cold processing production line and processing method of ordinary steel rebar cannot meet the requirements of automatic intelligent production of NPR steel rebar, cold rolled spiral NPR steel rebar, and pre-stressed NPR steel rebar.

SUMMARY

An embodiment of the present disclosure provides a processing method of NPR steel rebar rod to meet the requirements for automatic intelligent production of NPR steel rebar, cold rolled spiral NPR steel rebar, and pre-stressed NPR steel rebar.

In order to achieve the above object, the present disclosure provides a processing method of NPR steel rebar rod, wherein the NPR steel rebar is cold processed and has a yield strength of 800~950 MPa, a tensile strength of 900~1100 MPa, and a percentage elongation at maximum force of not less than 10~40%; the processing method comprises the following steps:

a I-shaped placing step L20: with one end of the steel rebar fixed on a rack, performing head-to-tail welding of the steel rebar at a front end of the steel rebar without stopping;

an uncoiling step L30: providing a drawing force to a I-shaped de-coiler along a travel direction of steel rebar to preliminarily flatten the steel rebar, and synchronizing the I-shaped de-coiler with a wire drawing machine through intelligent control equipment to deliver the steel rebar synchronously for subsequent steps;

a flattening step L40: repeatedly bending the steel rebar to remove a stress in the steel rebar using a wheel-rolling flattening method, so as to a flatten the steel rebar without scratch on its surface;

a butt welding step L50: matching a diameter of the steel rebar by controlling current using PLC numerical control technology, welding the steel rebar according to the time required for steel rebar welding and current for welding, and automatically removing burrs on a welding surface of the steel rebar after welding is completed;

a grit blasting step L60: automatically adjusting output of steel grit according to a diameter and surface requirements of the steel rebar to be processed, and processing oxide scales, and surface defects on the surface of hot-rolled NPR steel rebar inline, by using intelligent numerical control technology and communicating with a master controller;

a straightening step L70: after grit blasting, straightening the steel rebar by a straightening machine to make the steel bars more straight;

a pointing step L80: correcting or removing surface shape defects including "waterline" or "ellipse" of a head part of the steel rebar by a pointing process, during each start of head threading process in the production line;

a hydraulic head-pushing step L90: pushing the head part of the steel rebar to pass through a spiral mold, and setting a length of the head part of the steel rebar passing through the spiral mold according to requirements of the wire drawing machine;

a cold drawn spiral ribbing step L10: forming spiral ribs on the steel rebar by means of roller die cold rolling;

a straight forward continuous wire drawing and traction step L11: pulling forward the raw material continually in a straight line, and repeatedly and alternately gripping and stretching the steel rebar forward by a rebar gripping device;

a pre-straightening step L12: eliminating an internal stress of the steel rebar using a method of multi-wheeled crossed 360-degree curve rolling and straightening, without damaging the spiral ribs of the steel rebar during the pre-straightening process;

a fine straightening step L13: performing fine straightening on the basis of pre-straightening, using a method of multi-wheel crossed or horizontal straightening; and a cutting-off step L14: cutting off the NPR steel rebar rod inline with an adjustable cutting length within 4~12 meters per rod.

Further, after the cutting-off step L14, the method further comprises:

a tidying-up step L15: tidying up the steel rebars using a rolling rack, pushing the steel rebars to a position limiting device through a spiral conveying shaft, and then pushing the steel rebars by a screw device to a conveying trough for tidying up;

an intelligent conveying step L16: according to the data command given by a central master controller and information data such as the number of rebars, conveying distance and conveying residence time, delivering the steel rebars to a correct position for bundling;

an intelligent bundling step L17: bundling the steel rebars using a tying machine, wherein the steel rebar bundles pass through a closed wire way system and stop at a preset tying position to be bundled;

a conveying step L18: according to a data command of conveying distance and conveying residence time given by a central master controller, conveying the steel rebars to an unloading position; and an intelligent unloading step L19: issuing, by the central master controller, instructions to control the unloading position according to a length of the steel rebars, dragging the steel rebars to a designated position and putting them into a finished product storage hopper.

Further, before the I-shaped placing step L20, the method further comprises:

intelligent master control step L01: connecting an intelligent master control system to a remote computer server through an optical fiber network cable, realizing remote one-key automatic start and stop through the server, and checking running status and production information of production line equipment through the server.

In the processing method of NPR steel rebar rod of the present disclosure, the pickling step in the prior art is replaced by the grit blasting step L60, thereby meeting the national green environmental protection requirements, and realizing inline digital production; the I-shaped placing step L20 and uncoiling step L30 replaces the application of cannon de-coiler rack in the prior art, thereby realizing non-stop production, avoiding surface scratches and bending of steel rebar during the drawing process, and meeting the feeding requirements of high-strength steel rebar and large-diameter steel rebars; other steps can achieve full intelligence, meet the processing requirements of NPR steel rebar rod, and meet the automatic intelligent production requirements of NPR steel rebar, cold rolled spiral NPR steel rebar, and pre-stressed NPR steel rebar.

DETAILED DESCRIPTION

The present disclosure will be described in further detail below with reference to the drawings and specific embodiments, but they are not intended to limit the present disclosure.

Figure 1:
FIG. 1 is a schematic flow chart of a processing method of NPR rebar rod according to an embodiment of the present disclosure.
Figure 2:
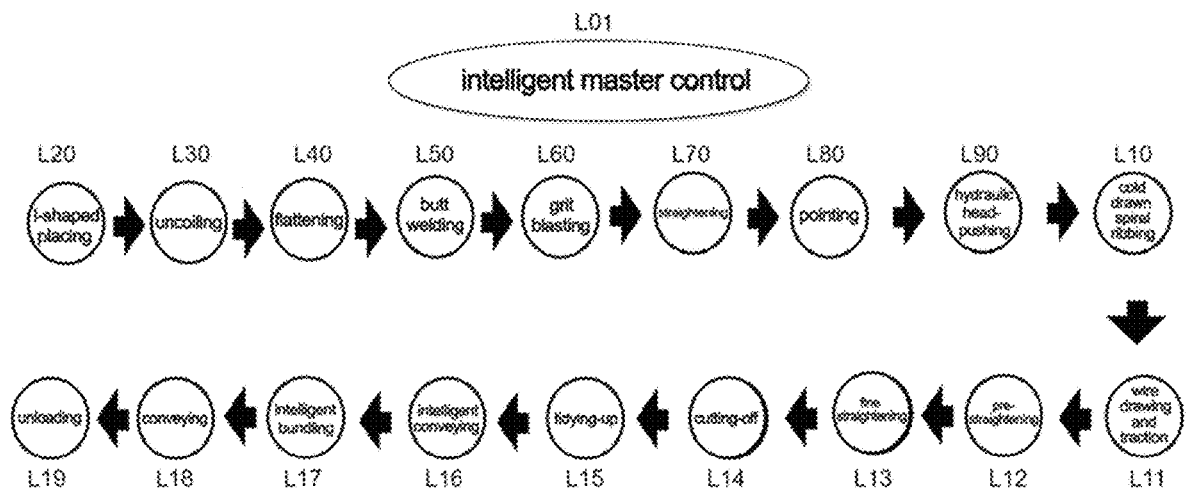
FIG. 2 is a schematic diagram of a specific flow chart of a processing method of NPR rebar rod according to an embodiment of the present disclosure.
Figure 3:
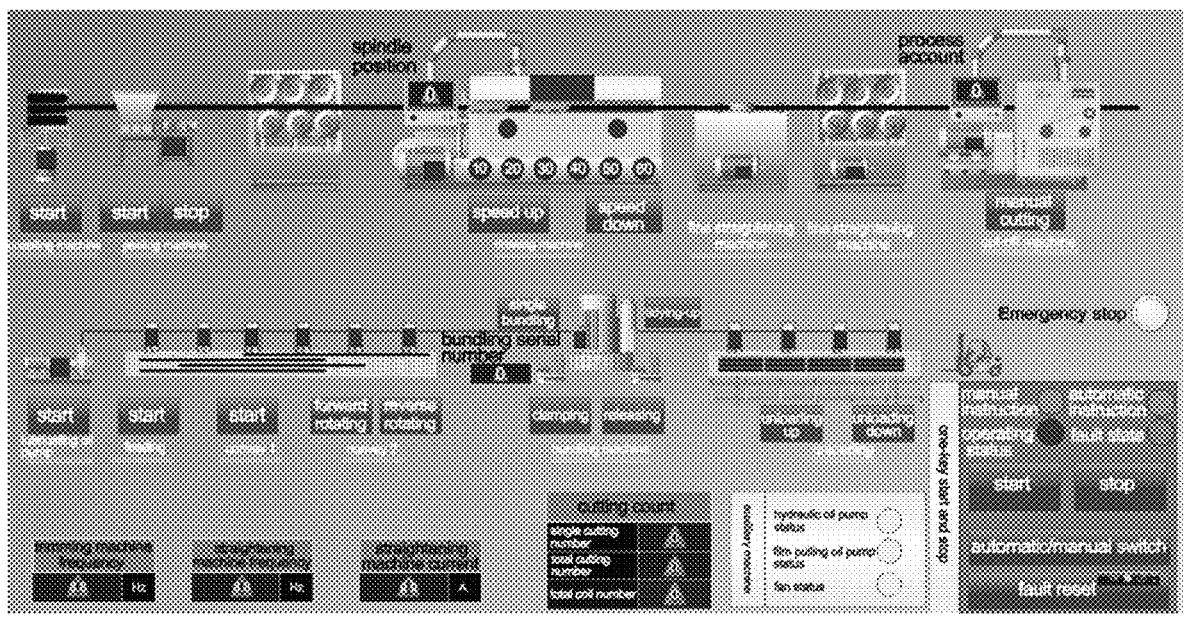
FIG. 3 is a schematic diagram of an intelligent master control system of the automatic intelligent cold rolled (cold drawn) NPR steel rebar coil production line.
Figure 4:
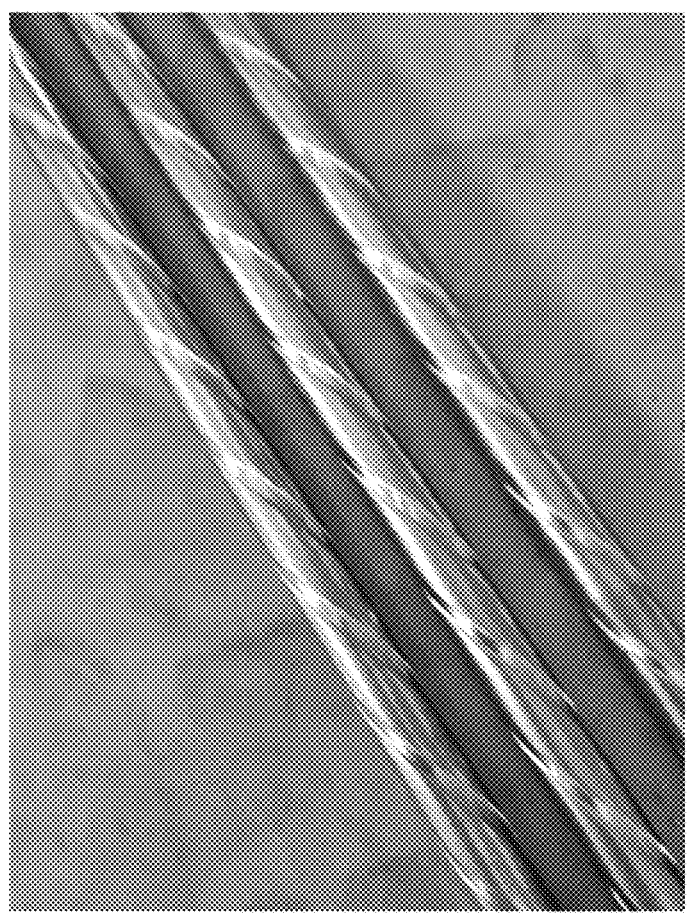
FIG. 4 is a photograph of spiral ribs of the NPR steel rebar obtained by the processing method of NPR steel rebar rod according to an embodiment of the present disclosure.
Figure 5:
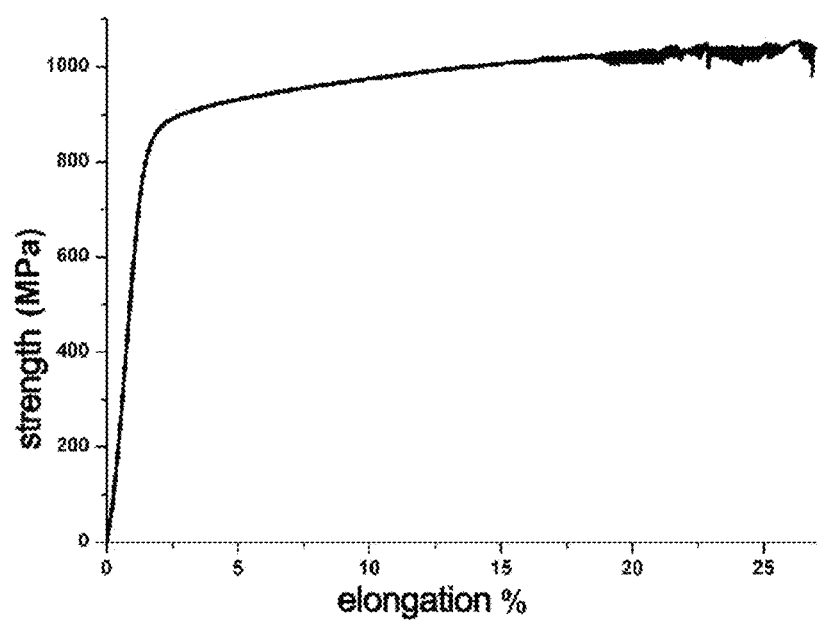
FIG. 5 is a schematic diagram of a tensile test curve of the NPR rebar obtained by the processing method of NPR rebar rod according to an embodiment of the present disclosure.

As shown in FIG. 1, according to an embodiment of the present disclosure, a processing method of NPR rebar rod is provided, in which an automatic intelligent production line of cold rolled (cold drawn) NPR rebar rod is used. The NPR rebar is cold processed, and has a yield strength of 800~950 MPa, a tensile strength of 900~1100 MPa, and a percentage elongation at maximum force of not less than 10~40%. The processing method comprises the following steps.

Intelligent master control step L01: the intelligent master control system is connected to a remote computer server through an optical fiber network cable, and the remote one-key automatic start and stop is realized through the server. The running status and production information of the production line equipment can be checked through the server. The control panel, buttons, PLC modules, power modules, contactors and other necessary electrical devices of each equipment can be used for automatic and manual control operations. The equipment related parameters such as equipment name, operating status, and steel yield information can be viewed.

I-shaped placing step L20: one end of the coil rack is fixed to perform the head-to-tail welding of the steel rebar. The head-to-tail welding of the steel rebar is performed at the front end of the steel rebar without stopping. After expanding and uncoiling, the steel rebar is drawn and unwound into an I-shaped coil rack center. The rotating end of the I-shaped coil rack rotates, so that the steel rebar can be flattened and unwound in the opposite direction of the coiling direction of raw material without generating axial torsion. The tail end of the steel rebar is fixed during the uncoiling process, and the head-to-tail welding can be realized without stopping, so that the normal production of the steel rebar can be realized without stopping.

Uncoiling step L30: a drawing force is provided to the I-shaped de-coiler along the travel direction of steel rebar to preliminarily flatten the steel rebar. The de-coiler is synchronized with the wire drawing machine through intelligent control equipment to deliver the steel rebar synchronously for the subsequent steps. The steel rebar is transported in a straight and flat state and at the same speed to the subsequent devices for flattening, grit blasting and other devices, thereby avoiding the surface scratches and bends of the steel rebar during the drawing process.

Flattening step L40: by using the wheel-rolling flattening method, the steel rebar is repeatedly bent to remove the stress in the steel rebar, so that the flat surface of the steel rebar is not scratched and enter the subsequent devices for grit blasting or wire wheel rust removal in a straight line.

Butt welding step L50: the current is controlled by using PLC numerical control technology to match the diameter of the steel rebar, and the steel rebar is welded according to the time required for steel rebar welding and current for welding. After the welding is completed, the burr on the welding surface of the steel rebar is automatically removed. The welder can weld high-carbon steel wire, low-carbon steel wire, austenitic steel rebar and NPR steel rebar; it can automatically remove the burrs on the welding surface of the steel rebar after welding, and can communicate with the master control equipment network, and can complete the inline welding task or the raw material storage welding task.

Grit blasting step L60: In order to replace the conventional pickling process, by communicating with the master control equipment using intelligent numerical control technology, automatically adjust the output of steel grit according to the diameter and the surface requirements of the steel rebar to be processed, and perform inline processing of the oxide scale and surface defects on the surface of the hot-rolled NPR steel rebar. The maximum processing speed can reach 80 m/min. After the treatment, the surface is smooth and has no oxide scales and surface defects. When the output speed of steel grit is too low, or the steel rebar stops moving, or the surface of the steel rebar is not completely processed, an alarm will be automatically produced and transmitted to the central master controller, and the equipment stops.

Straightening step L70: After grit blasting, the steel rebar is straightened by a straightening machine to make the steel bars more straight. The straightening step can ensure that the steel rebar is kept in the center and not eccentric. The spiral ribs and rib heights around the steel rebar after cold rolling are exactly the same.

Pointing step L80: the pointing process is used to correct or remove the surface shape defects such as "waterline" or "ellipse" of the head part of the steel rebar during each start of the head threading process in the production line, thereby efficiently solve the problem that the head part of the steel rebar cannot be used during cold rolling.

Hydraulic head-pushing step L90: the head part of steel rebar is pushed to pass through a spiral mold, and the length of the head part of steel rebar passing through the spiral mold can be set according to the requirements of the wire drawing machine, thereby avoiding the waste of steel rebar caused by sharpening or pointing of the steel rebar when passing the mold, and reducing the labor intensity and time waste of workers. This is a key process to realize automation.

Cold drawn spiral ribbing step L10: spiral ribs are formed on the steel rebar by means of roller die cold rolling. Specifically, multiple roller dies are uniformly arranged in the circumferential direction in a special rotation device which the base material passes through; when the base material is drawn by the wire drawing machine to pass through the rotation device, the multiple of roller dies produce spiral grooves on the surface of the base material through rolling friction.

Straight forward continuous wire drawing and traction step L11: the raw material is pulled forward continually in a straight line. Two rebar stretching trolleys are driven by two rotating cams. The trolley is equipped with a hydraulic or pneumatic rebar gripping device. The rebar gripping device repeatedly and alternately grips the steel rebar and stretches the steel rebar forward (similar to two human hands). This equipment is controlled by the CNC PLC central master controller and connected with the central processing unit to provide traction power for the entire production line.

Pre-straightening step L12: the method of multi-wheeled crossed 360-degree curve rolling and straightening is used to eliminate the internal stress of the steel rebar. The spiral ribs of the steel rebar will not be damaged during the pre-straightening process. It is connected to the central processing unit.

Fine straightening step L13: the method of multi-wheel crossed or horizontal straightening is used to perform fine straightening on the basis of pre-straightening. This equipment adopts intelligent, hydraulic straightening device and pneumatic traction device, is fully intelligently operated. It is connected with the central processing unit and equipped with an intelligent length measuring mechanism, which provides data of the cut length and the cutting positions of the head and tail of the steel rebar, so as to realize the automatic monitoring and cutting of the head and tail of the steel rebar.

Cutting-off step L14: the hydraulic pressure, nitrogen, energy storage, servo system and linear guide rail are used to cut off the NPR steel rebar rod inline. The cutting length can be adjusted within 4~12 meters per rod. The cutting length error is small, and the cut is straight (the cutter is a double-cylinder cutter), the cutting speed is high, and long-term and high-frequency cutting tasks can be performed. It is connected with the central processing unit and can transmit communication information with the control system to complete the task accurately.

In the processing method of NPR steel rebar rod of the present disclosure, the pickling step in the prior art is replaced by the grit blasting step L60, thereby meeting the national green environmental protection requirements, and realizing inline digital production; the I-shaped placing step L20 and uncoiling step L30 replaces the application of cannon de-coiler rack in the prior art, thereby realizing non-stop production, avoiding surface scratches and bending of steel rebar during the drawing process, and meeting the feeding requirements of high-strength steel rebar and large-diameter steel rebars; other steps can achieve full intelligence, meet the processing requirements of NPR steel rebar rod, and meet the automatic intelligent production requirements of NPR steel rebar, cold rolled spiral NPR steel rebar, and pre-stressed NPR steel rebar.

The above cold drawing spiral ribbing step L10 is carried out by a cold drawing spiral ribbing machine, and the production of spiral steel rebar is carried out by means of roller die cold rolling. Specifically, multiple roller dies are uniformly arranged in the circumferential direction in a special rotation device which the base material passes through; when the base material is drawn by the wire drawing machine to pass through the rotation device, the multiple of roller dies produce spiral grooves on the surface of the base material through rolling friction. Compared with the cold drawing method, when the spiral steel rebar is processed by the roller die cold rolling method, the drawing force of the wire drawing machine is halved, the service life of the mold can reach 3000-5000 tons of processed steel rebar, and the extension of the mold life makes it unnecessary to manually replace the mold frequently, which can save more than 90% of the mold cost. Moreover, there is no need to use lubricating grease, powder or oil during the processing, which greatly reduces production costs and labor intensity, and improves production efficiency. Compared with the prior art, it saves more than 20% of manpower, saves more than 60% of electricity, and increases production capacity by more than 20%; each production line can save 3 to 5 million RMB yuan every year.

Preferably, the method further comprises the following steps after the cutting-off step L14:

Tidying-up step L15: The steel rebars are tidied up by using a rolling rack. The steel rebars are pushed to the position limiting device through the spiral conveying shaft, and then are pushed by the screw device to the conveying trough to tidy up. The end faces of the whole bundle of steel rebars are straight and neat without entanglement or stretching out.

Intelligent conveying step L16: according to the data command given by the central master controller and information data such as the number of rebars, conveying distance, conveying residence time, the steel rebars can be accurately delivered to the correct position for bundling. The equipment for realizing this step is composed of U-shaped feeding trough, N number of flat drag rollers, N number of vertical rollers, baffle plate, turnover device, numerical control coder, length measurement device, tying device and counting device. It is controlled by PLC, frequency converter, central control unit, etc. to realize intelligent conveying.

Intelligent bundling step L17: the tying head is placed in an upper position, the tying wire is fed into the wire rail system. The tying machine bundles the steel rebars, and the steel rebar bundles pass through the closed wire way system and stop at a preset tying position and bundled. The intelligent bundling step is completed by an intelligent bundling machine. The intelligent bundling machine includes the following main components: a base, a tying head, a hydraulic station, an electric operation box and a pay-off rack. The base is equipped with two guide rail of grooved steel, and is used to support the frame of the bundling machine, the hydraulic station and the control cabinet. The bundling head includes a wire rail system, a wire feeding mechanism, a twisting head and a cutting block. The hydraulic station is an integrated hydraulic power station for the tying machine. The fuel tank has a capacity of about 400 liters. It is equipped with a variable plunger pump and has the power-saving function of automatic unloading. The fuel tank has its own liquid height and temperature monitoring, and has its own heater, cooler, filters and other conventional configurations to meet the needs of automatic rod bundling machines. The electrical operation box includes a control panel, buttons, PLC modules, power modules, contactors, circuit breakers and other necessary devices, and can be used for automatic and manual operation. It communicates with the central master controller, receives master control data, and complete a series of bundling tasks.

The pay-off rack includes a set of wire taking device and a wire storage rack for storing the tying wire.

Conveying step L18: according to the data command of the conveying distance and conveying residence time given by the central master controller, the steel rebars are conveyed to an unloading position. The equipment for realizing this step is composed of U-shaped feeding trough, N number of flat drag rollers, N number of vertical rollers, baffle plate, turnover device, numerical control coder, length measurement device, tying device and counting device. It is controlled by PLC, frequency converter, central control unit, etc. to realize intelligent conveying.

Intelligent unloading step L19: the central master controller issues instructions to control the unloading position according to the length of the steel rebars, drag the steel rebars to the designated position and put them into a finished product storage hopper. The equipment for realizing this step is composed of U-shaped groove, N number of flat drag rollers, PLC frequency converter, industrial computer, swing rod, CNC hydraulic pump station, and pressure adjustment device.

The above automatic intelligent processing method of cold rolled (cold drawn) NPR steel rebar rod has the advantages of low pollution, low energy consumption, intelligence, and high degree of automation, as well as stable quality control and low production costs. In particular, it solves a series of problems that exist in the conventional cold processing of steel rebars, such as environmental protection, low automation, large mold loss, high energy consumption, and the inability to directly process NPR steel rebars. After processed by the automatic intelligent production line of cold rolled (cold drawn) NPR steel rebar rod, the raw material of NPR steel rebar can realize high strength and high toughness, with a yield strength of up to 900 MPa and a percentage elongation at maximum force of not less than 20%.

It should be noted that the terminology used herein is only for describing specific embodiments and is not intended to limit the exemplary embodiments according to the present disclosure. As used herein, the singular forms are intended to include the plural forms as well, unless the context clearly indicates otherwise. It should also be understood that when the terms "include" and/or "comprise" are used in this specification, they indicate there are features, steps, operations, devices, components, and/or combinations thereof.

Of course, the above are only preferable embodiments of the present disclosure. It should be noted that those skilled in the art can make improvements and modifications without departing from the basic principles of the present disclosure, and these improvements and modifications shall also fall within the protection scope of the present disclosure.

What is claimed is:

1. A processing method of NPR steel rebar rod, wherein the NPR steel rebar is cold processed and has a yield strength of 800~950 MPa, a tensile strength of 900~1100 MPa, and a percentage elongation at maximum force of not less than 10~40%; the processing method comprises the following steps:

a placing step L20: fixing one end of a coil rack, and performing head-to-tail welding of the steel rebar at a front end of the steel rebar without stopping;

an uncoiling step L30: providing a drawing force to a de coiler along a travel direction of steel rebar to preliminarily flatten the steel rebar, and synchronizing the de-coiler with a wire drawing machine through intelligent control equipment;

a flattening step L40: repeatedly bending the steel rebar to remove a stress in the steel rebar using a wheel-rolling flattening method, so as to flatten the steel rebar without a scratch on its surface;

a butt welding step L50: matching a diameter of the steel rebar by controlling current using PLC numerical control technology, welding the steel rebar according to a time required for steel rebar welding and current for welding, and automatically removing burrs on a welding surface of the steel rebar after welding is completed;

a grit blasting step L60: automatically adjusting output of steel grit according to a diameter and surface requirements of the steel rebar to be processed, and processing oxide scales, and surface defects on the surface of hot-rolled NPR steel rebar inline, by using intelligent numerical control technology and communicating with a central master controller;

a straightening step L70: after grit blasting, straightening the steel rebar by a straightening machine to make the steel rebar more straight;

a pointing step L80: correcting or removing surface shape defects including waterline or ellipse of a head part of the steel rebar by using a pointing process, during each start of head threading process;

a hydraulic head-pushing step L90: pushing the head part of the steel rebar to pass through a spiral mold, and setting a length of the head part of the steel rebar passing through the spiral mold;

a cold drawn spiral ribbing step L10: forming spiral ribs on the steel rebar;

a straight forward continuous wire drawing and traction step L11: pulling forward the raw material continually in a straight line, and repeatedly and alternately gripping and stretching the steel rebar forward by a rebar gripping device;

a pre-straightening step L12: eliminating an internal stress of the steel rebar using a method of multi-wheeled crossed 360-degree curve rolling and straightening, without damaging the spiral ribs of the steel rebar during the pre-straightening process;

a fine straightening step L13: performing fine straightening on the basis of pre-straightening, using a method of multi-wheel crossed or horizontal straightening; and a cutting-off step L14: cutting off the NPR steel rebar rod inline with an adjustable cutting length within 4~12 meters per rod.

2. The processing method according to claim 1, wherein after the cutting-off step L14, the method further comprises:

a tidying-up step L15: tidying up the steel rebars using a rolling rack, pushing the steel rebars to a position limiting device through a spiral conveying shaft, and then pushing the steel rebars by a screw device to a conveying trough for tidying up;

an intelligent conveying step L16: according to a data command given by the central master controller and information data including a number of rebars, conveying distance, conveying residence time, delivering the steel rebars to a correct position for bundling;

an intelligent bundling step L17: bundling the steel rebars using a tying machine, wherein the steel rebar bundles pass through a closed wire way system and stop at a preset tying position to be bundled;

a conveying step L18: according to a data command of conveying distance and conveying residence time given by the central master controller, conveying the steel rebars to an unloading position; and an intelligent unloading step L19: issuing, by the central master controller, instructions to control the unloading position according to a length of the steel rebars, dragging the steel rebars to a designated position and putting them into a finished product storage hopper.

3. The processing method according to claim 1, wherein before the placing step L20, the method further comprises:

intelligent master control step L01: connecting the central master controller to a remote computer server through an optical fiber network cable, realizing remote one-key automatic start and stop through the server, and checking running status and production information of production line equipment through the server.

* * * * *

UNITED STATES PATENT AND TRADEMARK OFFICE
CERTIFICATE OF CORRECTION

| | |
|---|---|
| PATENT NO. | : 11,596,991 B2 |
| APPLICATION NO. | : 17/634181 |
| DATED | : March 7, 2023 |
| INVENTOR(S) | : Manchao He et al. |

It is certified that error appears in the above-identified patent and that said Letters Patent is hereby corrected as shown below:

On the Title Page

Please correct the assignees as follows:
(73) Assignees: Manchao HE and Min XIA

Signed and Sealed this
First Day of October, 2024

Katherine Kelly Vidal
*Director of the United States Patent and Trademark Office*